May 5, 1959  H. V. FEGELY  2,885,157
MATERIAL CRUSHING AND SIZING MEANS COOPERABLE
WITH RECIPROCATING CONVEYOR
Filed July 29, 1953  3 Sheets-Sheet 1

INVENTOR.
HARRIS V. FEGELY

BY John H. Widdowson
ATTORNEY

May 5, 1959 H. V. FEGELY 2,885,157
MATERIAL CRUSHING AND SIZING MEANS COOPERABLE
WITH RECIPROCATING CONVEYOR
Filed July 29, 1953 3 Sheets-Sheet 2

INVENTOR.
HARRIS V. FEGELY

BY John H. Widdowson
ATTORNEY

INVENTOR.
HARRIS V. FEGELY
BY John H. Widdowson
ATTORNEY

United States Patent Office 2,885,157
Patented May 5, 1959

2,885,157

MATERIAL CRUSHING AND SIZING MEANS COOPERABLE WITH RECIPROCATING CONVEYOR

Harris V. Fegely, Humboldt, Kans., assignor to The Monarch Cement Company, Humboldt, Kans., a corporation of Kansas Application July 29, 1953, Serial No. 370,940

14 Claims. (Cl. 241—262)

This invention relates to reducing the size of material. In a more specific aspect, this invention relates to mechanical means for crushing and/or sizing material. In a still more specific aspect, this invention relates to apparatus which cooperates with a reciprocating conveyor or vibrating screen to crush material conveyed by such conveyor or screen. In a still more specific aspect, this invention relates to means incorporated in and with a reciprocating grate type cement clinker conveyor wherein the clinkers are cooled, to crush the cement clinkers from the reciprocating cooler to a size desired for subsequent grinding to commercial powder size.

In the production of cement, that is, the ordinary variety often called hydraulic cement, the burning of the mixture of clay and limestone to produce the cement is carried out in a rotary kiln. The cement resulting from the burning operation leaves the kiln in clinker form, the clinkers being of all different sizes, some of them being quite large, weighing as much as 40 to 60 lbs. In addition, over a length of time in operation, the kilns build up cement clinkers on the walls which are not removed in the normal operation and which must literally be shot from the walls so that they can be removed from the kiln. As a result of this shooting procedure, huge clinkers are many times discharged from the kilns. The cement clinkers produced in the kilns, either during the usual operation or as a result of shooting the built up cement from the walls of the kiln, leave the kiln at a very high temperature, and they must be cooled prior to storage or grinding to powdered cement, the form in which it is normally transported and used to make concrete. Reciprocating grate type coolers have long been known in the art. The cooler is reciprocated by eccentric driving mechanism and the clinkers are conveyed therethrough in a bed on the horizontal disposed grate while air is blown through the bed of clinkers to cool them. The resulting cooled clinkers are discharged from the grate of the cooler and fall on another grate having spaced bars. Those clinkers of small enough size fall through this grate onto a conveying pan which reciprocates with the cooler and which in addition receives and conveys clinkers falling through the reciprocating cooler grate. The clinkers which are too large to pass between the bars of the grate which receives clinkers from the discharge of the cooler are retained thereon, and are normally broken by hand with a hammer or bar to a size small enough to pass through the grate onto the reciprocating conveyor pan. One or more men per shift are employed in cement plants to check on and break these oversized clinkers.

I have invented a mill or sizer or crusher which comprises, a reciprocable crusher which cooperates with a plurality of rotatable and eccentrically mounted disks, the edges of the disks and the reciprocable crusher furnishing the surfaces between which material is crushed. A very advantageous embodiment of the new crushing apparatus of my invention utilizes a reciprocable feeder having a crushing surface on its discharge end which cooperates with a second crushing surface to provide the means for crushing a material therebetween. A grate having bars spaced the desired distance apart is desirably used with the crushing surfaces of my apparatus to maintain the material to be crushed in the crushing zone between the surfaces. My new crushing or sizing or mill means can be used to crush or size many materials, such as coal, which can conveniently be conveyed on a reciprocating screen or grate while being washed free of impurities. However, I have found that the new crushing means of my invention is particularly desirably used with the well-known reciprocating cement clinker cooler referred to hereinbefore, as modified according to my invention, to reduce oversized clinkers from the cooler to a size desired for subsequent storage and grinding to commercial cement powder. I have found the apparatus of my invention to work extremely satisfactorily with the reciprocating grate type cement clinker cooler manufactured and sold by the Allis-Chalmers Manufacturing Company, whose home offices are Milwaukee, Wisconsin. Very little change need be made to the cooler. The use of the new crushing means of my invention with such cement clinker cooler has resulted in eliminating one man per shift, since no man power is required to break large clinkers. The savings in operation are, of course, very great and the apparatus of my invention pays for itself in a short time. The apparatus of my invention is easily and economically constructed. It is extremely reliable in operation, and has few parts which are subject to undue wear.

It is an object of this invention to provide new crushing, or sizing or mill means.

It is another object of this invention to provide new crushing means having a reciprocating crushing surface, such as a reciprocable feeder or conveyor constructed with a crushing surface on the discharge end, or providing existing reciprocable feeding or conveying mechanism with a crushing surface on the discharge end.

It is still another object of my invention to provide mechanism to cooperate with a modified reciprocable cement clinker cooler to reduce large clinkers discharged from the cooler to a size desired for storage and grinding into powdered cement.

Other objects and advantages of my invention will become apparent to one skilled in the art upon reading this disclosure.

Drawings accompany and are a part of this disclosure. The drawings depict preferred specific embodiments of the new crushing apparatus of my invention, and it is to be understood that such drawings are not to unduly limit the scope of my invention.

Figure 1 of the drawings is a side elevational view of a preferred specific embodiment of the new crushing means of my invention in operative position to a reciprocable conveyor having eccentric drive mechanism.

Figure 1:
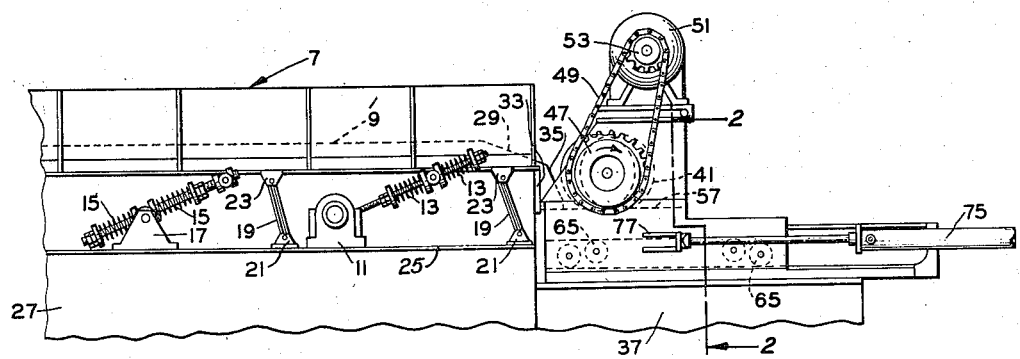

Following is a discussion and description of the new crushing, or sizing or mill means of my invention. The discussion and description is made with reference to the drawings, and it is to be understood that such discussion and description is not to unduly limit the scope of my invention. The same reference numerals are used on the drawings to indicate the same or similar part or structure.

Common cooler 7 has a grate 9 which reciprocates therewith to convey material on the grate through the cooler. Cement clinkers pass through the cooler on grate 9 in a bed while air is blown upwardly through the bed to cool the clinkers by common blower means (not shown). The cooler has an inlet (not shown) to receive cement clinkers from a cement kiln (not shown). Cooler 7 is reciprocated in a usual manner by means of drive mechanism 11 having an eccentric 14 and drive shaft 10. A drive rod 16 is connected to the cooler body 7 and eccentric 14, and drive shaft 10 is connected to the pulley 12. Suitable motor and belt means (not shown) can be used to turn pulley 12, and thus through drive shaft 10 and rod 16 reciprocate the cooler. Any number of drive mechanisms 11 can be used, as desired, one having been found sufficient in most instances on the usual size of cooler 7. Buffer springs 13 on the rod 16 serve to eliminate shock and to lighten the load on the eccentric drive shaft bearings. Usual inertia and buffer spring assembly 15 is pivotally mounted in bracket 17. This assembly provides for the cooler to operate with a true harmonic motion, and it is always in perfect balance due to the action of these inertia and buffer springs. Support arms 19 are pivotally mounted in brackets 21 and 23 which are in turn mounted on cooler support member 25 and cooler body 7, respectively. Support member 25 also mounts eccentric drive mechanism 11 and bracket 17. Support member 25 is in turn mounted on and supported by foundation 27 which is normally constructed of reinforced concrete. The reciprocating cooler usually has a plurality of inertia and buffer spring assemblies 15 and pivoted support arms 19, several on both sides of the cooler, the number depending on the length, load to be handled, etc. The cooler depicted is of the type manufactured by the Allis-Chalmers Manufacturing Company, whose head offices are in Milwaukee, Wisconsin. However, it is to be understood that other reciprocating conveyors, used for cooling material or otherwise, vibrating screen conveyors, and the like, can be used in the specific embodiments of my invention shown by the drawings as the reciprocating feeder mechanism furnishing power and one of the crushing surfaces.

Figure 5:
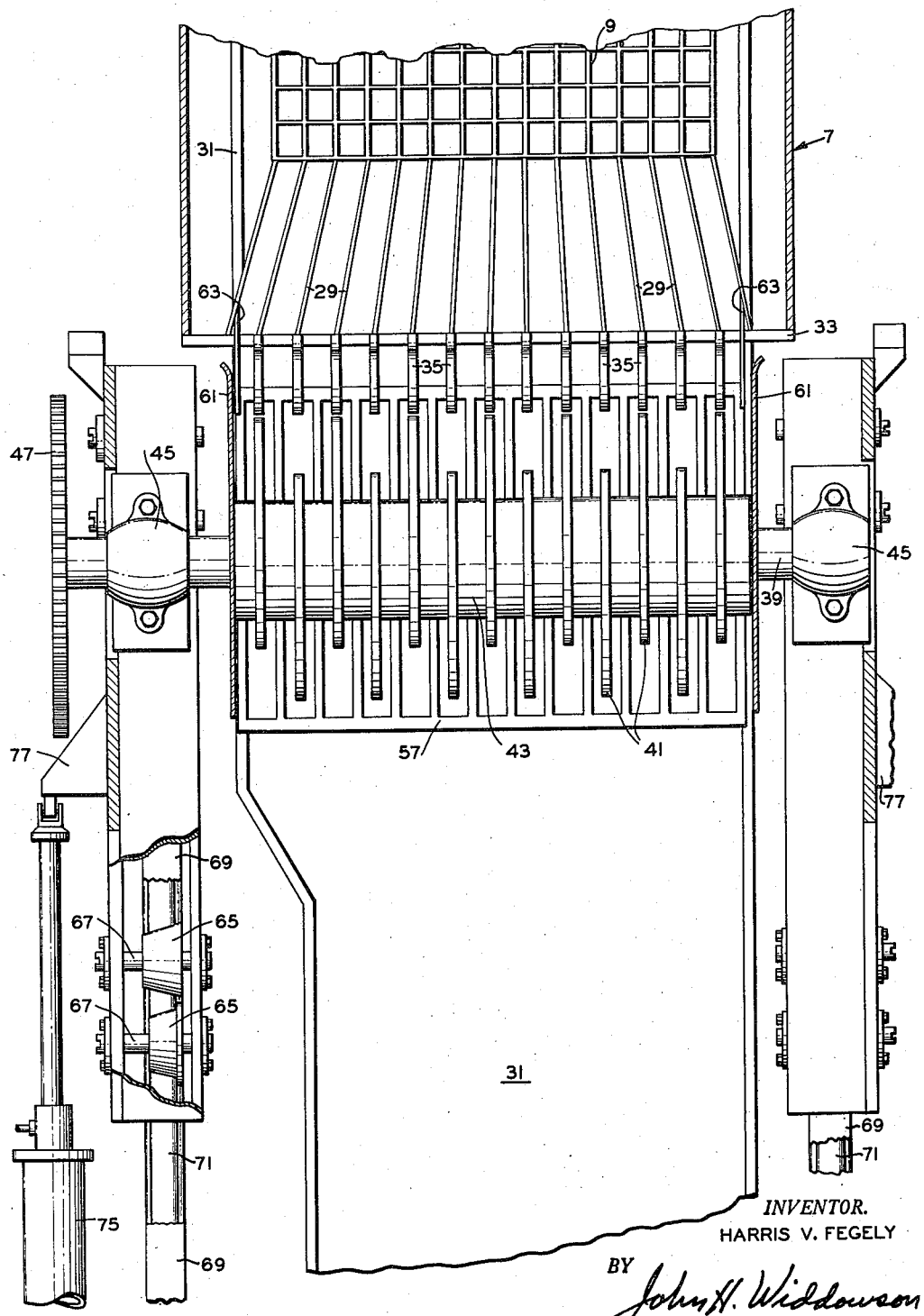
Figure 5 is a plan view, partly in cross section, and having cutaway views showing the crushing means of my invention in operative relation to a reciprocable conveyor, such being depicted in other views in Figures 1, 2, 3 and 4.

At the discharge end of the cooler, reciprocating grate 9 has a downwardly sloping portion with spaced members 29 over which cool concrete clinkers pass in being discharged from cooler 7. These spaced grate members 29 normally extend outwardly from the end of cooler 7 in already installed units. In these units, cool clinkers drop over the ends of members 29 onto a grate, through which the clinkers pass to a reciprocating conveying pan 31 which is a part of cooler 7, and pan 31 is rigidly connected to cooler 7 in any suitable manner and reciprocates with cooler 7 in operation, conveying pan 31 being supported in its outer portion by usual pivoted support members like members 19, these members supporting conveying pan 31 not being shown on the drawings. As shown in Fig. 5, pan 31 extends under grate 9 and receives clinkers passing therethrough in operation, and then pan 31 extends under grate members 29 and the new rotatable eccentric disks crusher mechanism of my invention to receive additional clinkers and convey them away. To modify such an existing installation to provide the crushing means of my invention, spaced grate members 29 are cut off flush with the end of cooler 7, as shown, and crushing head 33 is rigidly mounted on the end of cooler 7 in any suitable manner such as by bolts as shown. Crushing head 33 has a plurality of projecting members 35, which project forward from cooler 7 in their lower portions more than in their upper portions and whose outer edges form an inclined crushing surface. The crushing head assembly on the end of cooler 7 can be, of course, installed originally on the reciprocating cooler 7, and can conveniently be toothed (as shown), smooth, or corrugated. It has been found preferable and advantageous, for reasons set forth hereinafter, to make breaker teeth 35 deeper in their lower portions than in their upper portions.

The new rotatable eccentric disks crusher mechanism of my invention, which cooperates with cooler 7, having crushing head 33 therewith to crush cement clinkers discharged from cooler 7, is preferably mounted on a retractable carriage which is in turn mounted on foundations 37, which can conveniently be reinforced concrete. The carriage assembly mounts a rotatable axle 39 on which is preferably rigidly mounted in any suitable manner, such as by welding or key mount, a plurality of eccentric disks 41, adjacent disks preferably being mounted oppositely. Spacers 43 are mounted on axle 39 in any suitable manner between eccentric disks 41 and on the outside of the outmost eccentric disks. It has been found preferable to use spacers 43 to keep material from working too far in between disks 41. If desired, disks 41 can be mounted on a rotatable drum type axle, thus eliminating the spacers 43, the drum axle itself serving the purpose of the spacers. Axle 39 is preferably bearing mounted in housings 45 on either side of the retractable carriage assembly. A sprocket 47 which receives chain 49 is mounted on one end of axle 39. Chain 49 is driven to turn axle 39 and in turn the eccentric disks 41 by motor means 51 having sprocket 53. Motor 51 is mounted on the upper support member 55 of the carriage and is retractable with the carriage. Motor 51 preferably rotates to turn disks 41 in the direction shown by the arrow on the disks in Figure 3, that is, up and away from teeth 35 of crushing head 33.

A grate 57 is rigidly mounted in any suitable manner between the side carriage support members below axle 39. Upon rotation eccentric disks 41 pass between the spaced parallel bars of grate 57. Grate 57 functions to retain oversize cement clinkers thereon and in crushing position to eccentric disks 41 and the crushing teeth 35 of crushing head 33. Clinkers exiting from cooler 7 fall onto this grate, and therethrough if small enough, and, of course, those crushed by the size reducing apparatus of my apparatus fall through when small enough.

Upper carriage support member 55 along with teeth 59 forms a comb, the teeth 59 of which extend downwardly between eccentric disks 41. These teeth 59 function to remove clinkers caught between adjacent eccentric disks 41 and prevent the clinkers from being carried over by the eccentric disks. The clinkers combed out from between disks 41 fall back onto grate 57 where they either pass therethrough onto conveyor pan 31 or are crushed.

Guard members 61 on the retractable carriage and guard members 63 on cooler 7 prevent clinkers from falling out over the sides off grate 57 when the apparatus is in operation. Guard members 61, in addition, form a portion of the side support structure of the retractable carriage assembly.

Figure 2:
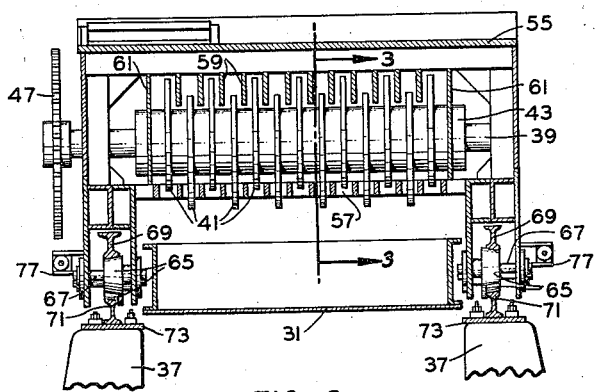
Figure 2 is a view taken on lines 2—2 of Figure 1.

The beveled wheels 65 on which the retractable carriage rides are preferably mounted on fixed axles 67 which are mounted in any suitable manner on the side support members of the carriage. There are four pairs of these wheels 65, two pairs on each side of the carriage mounted in position as shown in Figures 1, 2 and 5. One wheel 65 of each of the four pairs rides on an upper rail 69 of the carriage, and the other wheel 65 of each pair rides on a lower rail 71. Lower rails 71 are secured to plates 73 which in turn are rigidly mounted on foundation 37. Rails 69 and 71 are beveled opposite to wheels 65 to provide for a minimum of sideways movement of the carriage assembly. The rigidity of the carriage resulting from such mounting has been found very desirable, since in operation an eccentric disk 41 is maintained approximately opposite a crushing tooth 35 at all times. Other suitable means of mounting the carriage can be used and stationary positioning of the eccentric disk crushing surface can be provided for, if desired. However, I have found that retractable carriage mounting as shown in the drawings is very advantageous because with such it is easy to retract the disk assembly from operating position to inspect, repair, etc., the cooler or carriage assembly, should the occasion arise.

A double-acting cylinder motor 75 has the outer end of its piston rod pivotally connected to bracket means 77 which is mounted on the carriage. The head end of motor 75 can conveniently be attached to a wall, floor, etc. (not shown). It is desirable to use a motor 75 on either side of the carriage assembly, and I have found that a pneumatically operated cylinder is preferable, air pressure being left on the motor with the carriage in advanced position, thus providing cushion against which the crushing disk assembly rides in operation. However, a double-acting hydraulic cylinder is satisfactory, and, of course, other means can be used to advance and retract the carriage, if desired.

Figure 3:
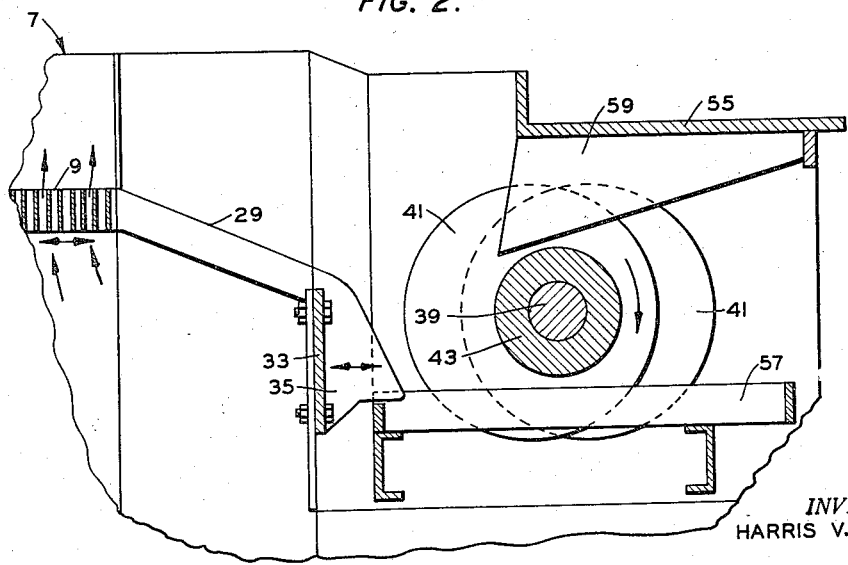
Figure 3 is a view taken on lines 3—3 of Figure 2.
Figure 4:
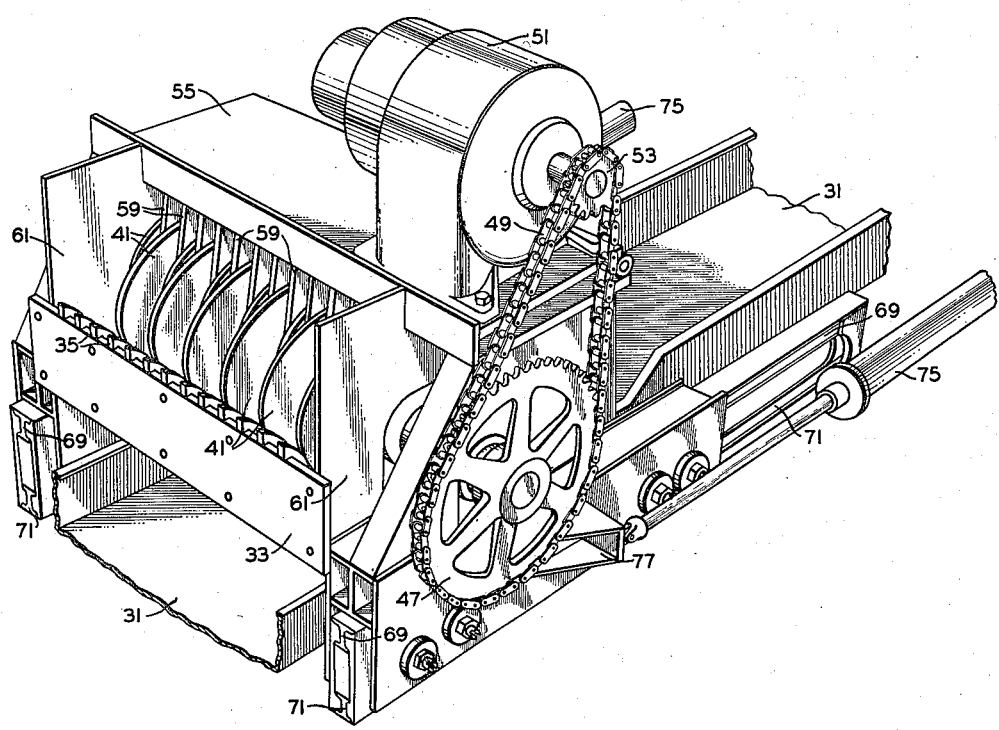
Figure 4 is a perspective view of the apparatus shown in Figures 1, 2 and 3, showing the discharge end crushing plate of the reciprocable conveyor in operative relation to the eccentric disks crushing means of my invention.
Figure 6:
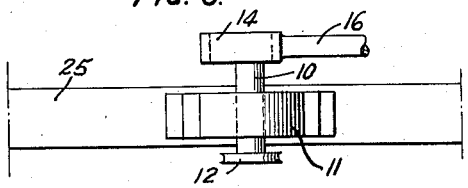
Fig. 6 is a top plan view enlarged of the drive mechanism used in reciprocating the conveyor shown in Fig. 1.

In operation, the carriage having the eccentric disk crushing surface is moved into the position shown best in Figure 5, which is a top view, and axle 39 is rotated in the direction indicated by the arrow on Figure 3 at a relatively slow rate, speed of rotation having been found to not be critical. In this connection, the direction of rotation of the disks has been found to be important only as regards power consumption of breaker drive motor 51, and in some uses and installations, it is anticipated by me that forced rotation of the dick by power means will not be necessary. However, for the crushing of typical cement clinkers, it has been found preferable to rotate the eccentric disks by power means in the direction shown.

The clinkers falling onto fixed grate 57 from reciprocating grate members 29 and in turn from grate 9, either fall through grate 57 onto pan 31 or are retained in the crushing zone between teeth 35 and disks 41. The force to crush comes from the ordinary reciprocatory movement of the cooler which results in conveying the clinkers therethrough during cooling, and my apparatus has been found to work to crush cement clinkers of all sizes without interfering with the conveying function of the usual reciprocating cooler. The non-interference with the conveying function of the cooler was surprising. In addition, the Allis-Chalmers air quenching clinker cooler on and with which the apparatus of my invention works to great advanatge has automatic control for cooler speed to hold a uniform thickness of clinker bed on clinker grate 9, and even this automatic control was not interfered with.

The new crusher of my invention is purposely designed to be a poor crusher, that is, the crushing blows struck by a tooth 35 with the clinker caught between the tooth and an edge of a disk 41 will not continue to be of the same force, since the disk edge crushing surface which provides backing is moving away from tooth 35. In addition, many clinkers fall away from in contact with the crushing surfaces, being shoved back into crushable position by the general jostling about. It has been found that in some instances, several blows on the clinker will be struck before it is completely crushed to particles of a size that will fall through grate 57. The planned deliberate inefficiency of the crusher resulting from the up and away movement of the eccentric disks, in turn results in approximately only one or two blows on a clinker being struck before the disk rotates away from crushing position, the disk continuing to rotate then comes back to crushing position. This has been found to allow the cooler and reciprocating conveyor 7 to regain momentum, if such has been lost as a result of blows struck on a clinker, before more blows are struck.

In the event an object too hard or tough to crush falls onto grate 57, the entire carriage assembly will be pushed back temporarily, since in the preferred means only the pneumatic force of motors 75 act to hold the carriage in operating position. The apparatus of my invention has been in use for days on end without any attention being required or trouble encountered, and an operator to crush clinkers from the cooler can be eliminated entirely.

As will be evident to those skilled in the art, various modifications of my invention can be made, or followed, in the light of this disclosure and discussion, without departing from the spirit or scope of the disclosure or from the scope of the claims.

I claim:

1. A cement clinker mill comprising, in combination, a horizontally disposed reciprocable cooler having a grate to support cement clinkers and adapted at one end portion to receive cement clinkers and at the other end portion to discharge cement clinkers, eccentric driving mechanism adapted to reciprocate said cooler to convey cement clinkers therethrough on said grate while agitating said clinkers, a plate having a plurality of evenly spaced crushing teeth projecting outwardly therefrom, said plate transversely and rigidly mounted on the discharge end of said cooler below the upper level of said grate and said teeth projecting farther in a lower portion than in an upper portion, a plurality of disks eccentrically and rigidly mounted on a driven axle, the curved edges of said disks being crushing surfaces and adjacent disks being disposed oppositely, a retractable carriage mounting said axle, said carriage riding on rails and adapted to hold said axle in advanced and operating position with a disk edge proximate and opposite each of said crushing teeth and with said teeth farther in their upper portions from said disks than in their lower portions, a horizontally disposed grate rigidly mounted on said carriage under said axle and said discharge end of said cooler, said grate adapted to retain cement clinkers thereon in a crushing zone between said crushing disks and teeth until crushed to a size to pass therethrough upon reciprocation of said cooler, a comb rigidly mounted on said carriage above said axle, the teeth of said comb projecting downwardly between said disks and adapted to comb out clinkers caught between said disks, a pan rigidly connected to said cooler to reciprocate therewith, said pan extending under both of said grates and adapted to receive and convey clinkers falling therethrough, means to rotate said axle, and means to advance and retract said carriage.

2. Crushing apparatus for use in combination with a reciprocable cement clinker conveyor and cooler to crush cooled clinkers, which comprises, in combination, a plurality of evenly spaced disks eccentrically and rigidly mounted on a horizontally disposed axle, the curved edges of said disks being crushing surfaces and adjacent disks being disposed oppositely, a retractable carriage riding on rails mounting said axle, a horizontally disposed grate rigidly mounted on said carriage under said axle and disks, a comb rigidly mounted on said carriage above said axle, the teeth of said comb projecting downwardly between said disks and adapted to comb out clinkers caught between said disks, means to rotate said axle, and means to advance and retract said carriage.

3. Mill apparatus for use with a reciprocable feeder having a crushing surface on the discharge end thereof, which comprises, in combination, a plurality of spaced disks eccentrically mounted on an axle, the curved edges of said disks being crushing surfaces, a grate extending under said axle and disks, said grate mounted and positioned to keep material to be crushed in crushable relation to said disks, means to remove material caught between said disks, means to rotate said disks and said disks positioned in relation to said grate so that in crushing operation said edge crushing surfaces of said disks move in rotation to increase the distance between said edge crushing surfaces and said crushing surface on said discharge end of said feeder, and means to mount said grate and said axle.

4. The apparatus of claim 3 wherein adjacent disks are mounted oppositely.

5. A cement clinker mill comprising, in combination, a reciprocable cement clinker cooler adapted to receive clinkers at one end, convey them therethrough and discharge them at the other end, means to reciprocate said cooler, a crushing head mounted on the discharge end of said cooler to reciprocate therewith, a plurality of spaced disks eccentrically mounted on an axle and to oppose said crushing head, the curved edges of said disks being crushing surfaces and adjacent disks being disposed oppositely, means to rotate said disks, a grate, said grate extending under said axle and discharge end of said cooler, the lower portion of said crushing head extending further toward said disks than the upper portion thereof, and said disks, crushing head and grate being operably positioned and mounted to crush cement clinkers retained on said grate between said disks and head upon reciprocation of said cooler, means to remove clinkers caught between said disks, and means to mount said grate and said axle.

6. The apparatus of claim 5 wherein said crushing head is a plurality of projecting spaced crushing members at least some of which are disposed opposite the edges of said disks when in operating position.

7. A mill comprising, in combination, a reciprocable feeder having a crushing surface attached thereto on the discharge end to reciprocate therewith in operation, means operatively connected to said feeder to in operation reciprocate same, a plurality of spaced disks rotatably and eccentrically mounted to oppose said feeder and said crushing surface on the discharge end thereof, said crushing surface and the curved edges of said eccentric disks operatably positioned and mounted to crush material retained therebetween upon reciprocation of said feeder, and a grate, the top portion of said grate being mounted below the axes of said disks and said crushing surface and extending between and under a portion of said crushing surface and said disks, and said grate constructed to retain said material in crushable position until crushed between said surface and disks to a size to pass through said grate.

8. The apparatus of claim 7 wherein said crushing surface is the end surface of a plurality of spaced members projecting outwardly from the end of said feeder, and the lower portion of said crushing surface extends further toward said disks than the upper portion of said crushing surface.

9. A mill comprising, in combination, a reciprocable feeder operable in substantial horizontal reciprocation and having a substantial horizontal bed and a crushing surface on the discharge end to reciprocate therewith in operation, means operatively connected to said feeder to in operation reciprocate said feeder, and a plurality of rotatable and eccentrically mounted disks mounted to oppose said crushing surface, the curved edges of said disks being crushing surfaces and said crushing surface and disks operatively mounted and positioned to crush material therebetween upon reciprocation of said feeder.

10. A mill comprising, in combination, a reciprocable crusher, means operatively connected to said crusher to in operation reciprocate same, and a plurality of rotatable and eccentric disks oppositely mounted to oppose said crusher, the curved edges of said disks being crushing surfaces, and said crusher and said disks operatively mounted and positioned to crush material therebetween upon reciprocating said crusher, the lower portion of the crushing surface of said reciprocable crusher extending further toward said disks than the upper portion of said crushing surface of said reciprocable crusher.

11. A mill comprising, in combination, a reciprocable feeder operable in substantially horizontal reciprocation and having a substantially horizontal bed and a crushing surface on the discharge end thereof to reciprocate therewith in operation, means operatively connected to said feeder to in operation reciprocate same, and a separate crushing surface mounted to oppose said feeder and said crushing surface thereon, and said crushing surface on said feeder and separate crushing surface operatively mounted and positioned to simultaneously contact and crush material between said crushing surface of said feeder and said separate crushing surface upon reciprocating said feeder.

12. Crushing apparatus for use with a crushing surface which reciprocates in operation, which comprises, in combination, a plurality of rotatable disks eccentrically mounted on an axle, the curved edges of said disks being crushing surfaces, means with said disks and axle to mount same to oppose said crushing surface which reciprocates in operation, and a grate, said grate mounted and positioned to keep material to be crushed in crushable relation to said disks, and said disks positioned in relation to said grate so that in crushing operation said edge crushing surfaces of said disks move to increase the distance between said edge crushing surfaces and said reciprocable crushing surface.

13. A mill comprising, in combination, a reciprocable feeder having a crushing surface on the discharge end to reciprocate therewith in operation, means operatively connected to said feeder to in operation reciprocate said feeder, and a plurality of rotatable and eccentrically mounted disks oppositely mounted to oppose said crushing surface, the curved edges of said disks being crushing surfaces and said crushing surface and disks operatively mounted and positioned to crush material therebetween upon reciprocation of said feeder, the lower portion of said crushing surface extending further towards said disks than the upper portion of said crushing surface.

14. A mill comprising, in combination, a reciprocable feeder having a crushing surface on the discharge end to reciprocate therewith in operation, means operatively connected to said feeder to in operation reciprocate said feeder, and a plurality of rotatable and eccentrically mounted disks oppositely mounted to oppose said crushing surface, the curved edges of said disks being crushing surfaces and said crushing surface and disks operatively mounted and positioned to crush material therebetween upon reciprocation of said feeder, said crushing surface being the outer edges of a plurality of spaced members projecting outwardly from said feeder, and the lower portion of said crushing surface extending further toward said disks than the upper portion of said crushing surface.

References Cited in the file of this patent

UNITED STATES PATENTS

| | | |
|---|---|---|
| 1,419,407 | Pardee | June 13, 1922 |
| 1,459,340 | Nevill | June 19, 1923 |
| 1,515,377 | White | Nov. 11, 1924 |
| 1,537,163 | Giunta et al. | May 12, 1925 |
| 1,600,462 | Fahnestock | Sept. 21, 1926 |
| 1,670,748 | Shelton | May 22, 1928 |
| 2,084,976 | Puerner | June 22, 1937 |
| 2,174,461 | Fegley | Sept. 26, 1939 |
| 2,187,273 | Larson | Jan. 16, 1940 |
| 2,208,040 | Moeller | July 16, 1940 |
| 2,559,701 | Becker | July 10, 1951 |
| 2,609,149 | Posselt | Sept. 2, 1952 |

FOREIGN PATENTS

| | | |
|---|---|---|
| 99,119 | Germany | Sept. 9, 1898 |
| 180,185 | Germany | Jan. 23, 1907 |

UNITED STATES PATENT OFFICE
CERTIFICATE OF CORRECTION

Patent No. 2,885,157                                                 May 5, 1959

Harris V. Fegely

It is hereby certified that error appears in the printed specification of the above numbered patent requiring correction and that the said Letters Patent should read as corrected below.

Column 7, lines 54 and 55, for "substantial", each occurrence, read -- substantially --.

Signed and sealed this 22nd day of September 1959.

(SEAL)
Attest:

KARL H. AXLINE                                               ROBERT C. WATSON
Attesting Officer                                          Commissioner of Patents